US006537444B2

(12) United States Patent
Wilberscheid et al.

(10) Patent No.: US 6,537,444 B2
(45) Date of Patent: Mar. 25, 2003

(54) REPLACEABLE-CARTRIDGE FILTER WITH DATA TRANSMISSION FEATURE

(75) Inventors: Daniel J. Wilberscheid, Cookeville, TN (US); Robert R. Brackett, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/827,078

(22) Filed: Apr. 5, 2001

(65) Prior Publication Data

US 2002/0144937 A1 Oct. 10, 2002

(51) Int. Cl.[7] .............................. B01D 35/143
(52) U.S. Cl. ...................... 210/85; 210/91; 210/236; 210/282; 210/497.01
(58) Field of Search ................... 210/85, 91, 143, 210/232, 236, 282, 348, 453, 497.01, 455; 96/417; 340/603

(56) References Cited

U.S. PATENT DOCUMENTS

| | | | |
|---|---|---|---|
| 2,407,046 A | * | 9/1946 | Vokes |
| 3,186,549 A | | 6/1965 | Botstiber |
| 3,317,042 A | | 5/1967 | Botstiber |
| 3,323,648 A | * | 6/1967 | Rosaen |
| 3,325,009 A | | 6/1967 | Botstiber et al. |
| 4,562,431 A | | 12/1985 | Jahnke et al. |
| 4,756,824 A | | 7/1988 | Howard, Jr. et al. |
| 4,997,556 A | | 3/1991 | Yano et al. |
| 5,035,797 A | | 7/1991 | Janik |
| 5,044,335 A | | 9/1991 | Flaig |
| 5,061,364 A | | 10/1991 | Metala et al. |
| 5,302,284 A | | 4/1994 | Zeiner et al. |
| 5,322,624 A | | 6/1994 | Rogers et al. |
| 5,458,767 A | | 10/1995 | Stone |
| 5,599,460 A | | 2/1997 | Van Schoiack et al. |
| 5,676,842 A | * | 10/1997 | Bedi et al. |
| 5,770,065 A | | 6/1998 | Popoff et al. |
| 5,823,229 A | * | 10/1998 | Bertrand et al. |
| 5,837,137 A | | 11/1998 | Janik |
| 5,855,772 A | | 1/1999 | Miller et al. |
| 6,051,144 A | * | 4/2000 | Clack et al. |
| 6,372,133 B1 | * | 4/2002 | von der Hardt et al. |
| 6,391,102 B1 | * | 5/2002 | Bodden et al. |
| 2001/0042707 A1 | * | 11/2001 | Niers et al. |

FOREIGN PATENT DOCUMENTS

WO    WO/0040322 A1    7/2000

* cited by examiner

*Primary Examiner*—Joseph W. Drodge
*Assistant Examiner*—Terry K. Cecil
(74) *Attorney, Agent, or Firm*—Woodard, Emhardt, Naughton Moriarty & McNett LLP (57) ABSTRACT

A replaceable filter cartridge includes a filter element 24 and an end plate 25 bonded to an end thereof The end plate includes at least two electrical contacts 52, 53 and a key way 67 that includes a relief section 75. Upon proper installation of the filter cartridge into the housing of a filter assembly, a key 41 attached to a centerpost 33 of the housing is received in the relief section of the end plate and the electrical contacts thereof make contact with corresponding electrical contacts in the housing causing a data component 49 to be energized. The data component may include a sensor, data chip, or resistor assembled to an exposed surface of the endplate.

9 Claims, 11 Drawing Sheets

REPLACEABLE-CARTRIDGE FILTER WITH DATA TRANSMISSION FEATURE

BACKGROUND OF THE INVENTION

The present invention relates in general to fluid filters which include a housing and a replaceable filter-element cartridge which is designed to be installed into the housing for use in a vehicle or machine. More specifically, the present invention relates to fluid filter designs which incorporate an electronic data transmission component such as a sensor, data chip, electrical connection strip, or resistor. Such electronic devices or components are used to receive and/or provide data regarding the replaceable filter-element cartridge and/or the condition of the fluid being filtered. A further feature of the present invention relates to a fluid filter design which includes a keyed cartridge and a cooperating housing so as to ensure not only proper orientation of the cartridge at every installation, but a singular proper orientation in order to establish an electrical interconnect between the endplate of the cartridge and the housing which is designed with cooperating contacts for whatever electronic device or component is incorporated as part of the replaceable cartridge. An electrical interconnect between the cartridge and the housing for any sensors or other electronic devices can be guaranteed due to the keyed relationship between the cartridge and housing that provides a precise positional relationship which is the same with each cartridge installation.

As environmental regulations become more stringent in Europe and North America, original equipment manufacturers (OEM's) will be forced to specify the use of housings and replaceable cartridge filters in order to eliminate waste disposal costs of spin-on filters and allow for possible incineration of the filters. One of the issues with the use of replaceable cartridges today is the lack of any regulations to ensure that low cost filter manufacturers supply parts that meet the OEM specifications. Accordingly, the OEM is not currently assured of the proper level of filtration being used in their applications, which can result in reduced durability of the equipment or engine. There is also a need to ensure proper maintenance of the equipment or engine in order to verify if an under-warranty claim should be paid to a customer. Today, under-warranty claims are paid based on the ability of the customer to show proper maintenance of the equipment by way of service shop records. If no such records are available, the replacement of the equipment or engine should be paid by the customer. However, in order to maintain good customer relations, these replacement costs are often still paid out by the OEM because the OEM can not conclusively prove that the equipment was improperly maintained. Therefore, there has been a long felt need for a filter cartridge assembly that ensures proper filter cartridge installation and maintenance.

SUMMARY OF THE INVENTION

One form of the present invention concerns a replaceable cartridge for a filter assembly. The filter assembly includes a housing that has a pair of electrical housing contacts. The replaceable cartridge includes a filter element that has a sidewall, which defines a hollow interior. The filter element is constructed and arranged to filter a fluid. An endplate is provided at one end of the filter element, and a pair of electrical filter contacts are coupled to the endplate. The filter contacts are constructed and arranged to contact the housing contacts upon installation of the replaceable cartridge into the housing. A data component is operatively coupled to the filter contacts. The data component is constructed and arranged to provide filtration data information to a remote station when the data component is energized.

Another form of the present invention concerns a filter assembly. The filter assembly includes a housing that has a pair of electrical housing contacts and a replaceable cartridge provided in the housing to filter a fluid. The cartridge includes a filter element that has a sidewall which defines a hollow interior. An endplate is provided at one end of the filter element, and a pair of electrical filter contacts are coupled to the endplate. The filter contacts touch the housing contacts, and a data component is operatively coupled to the filter contacts. The data component is constructed and arranged to provide filtration data information to a remote station when the data component is energized.

One object of the present invention is to provide an improved replaceable cartridge for a filter assembly.

Related objects and advantages of the present invention will be apparent from the following description.

BRIEF DESCRIPTION OF THE DRAWINGS

FIGS. 8A–8C are partial, diagrammatic views of the installation sequence for the FIG. 6 filter cartridge into the FIG. 5 housing and onto the centerpost of that housing, starting with the relationship of FIG. 8A.

DESCRIPTION OF PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
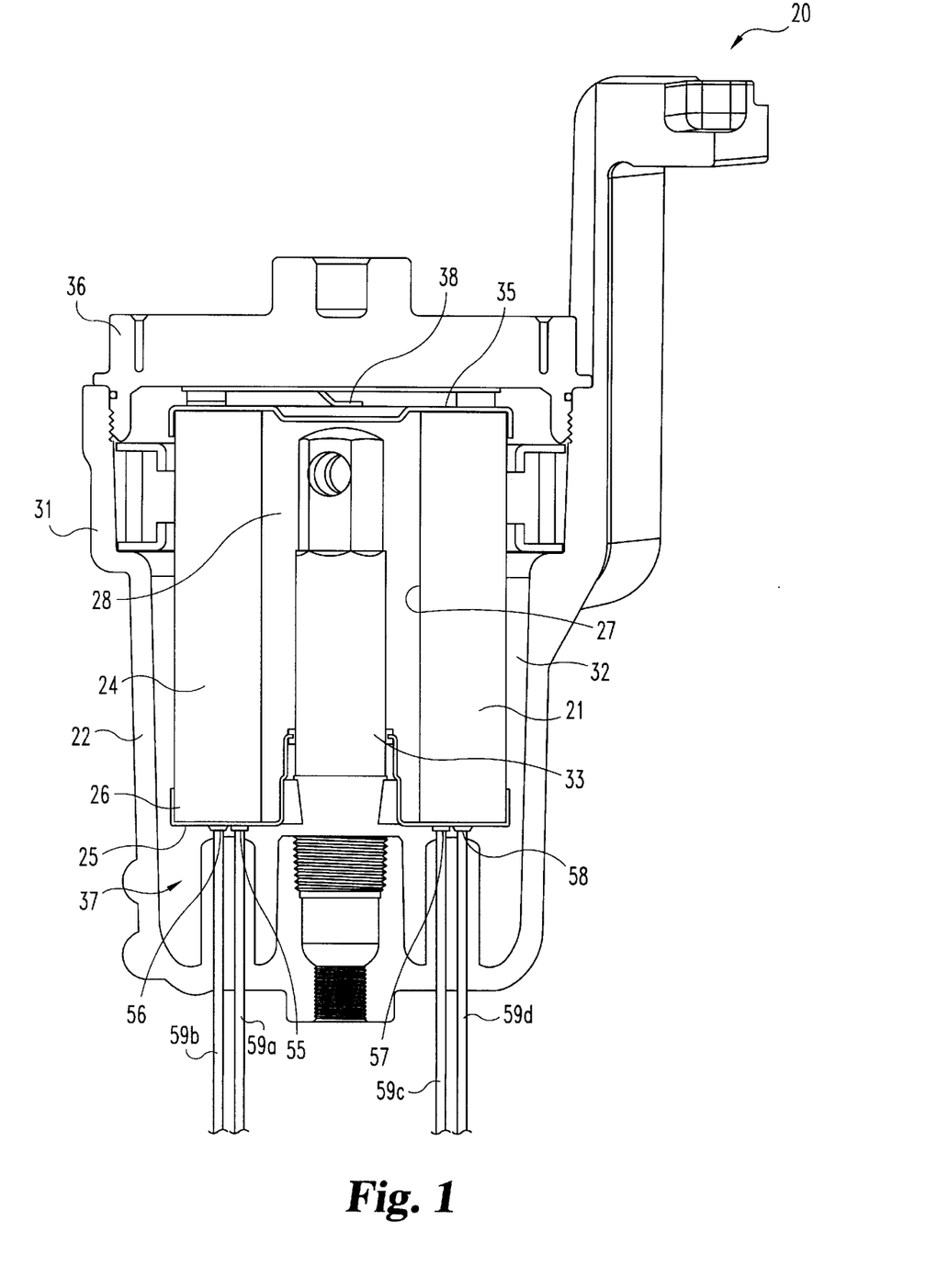
FIG. 1 is a front elevational view in full section of a replaceable-cartridge filter according to a typical embodiment of the present invention.
Figure 2:
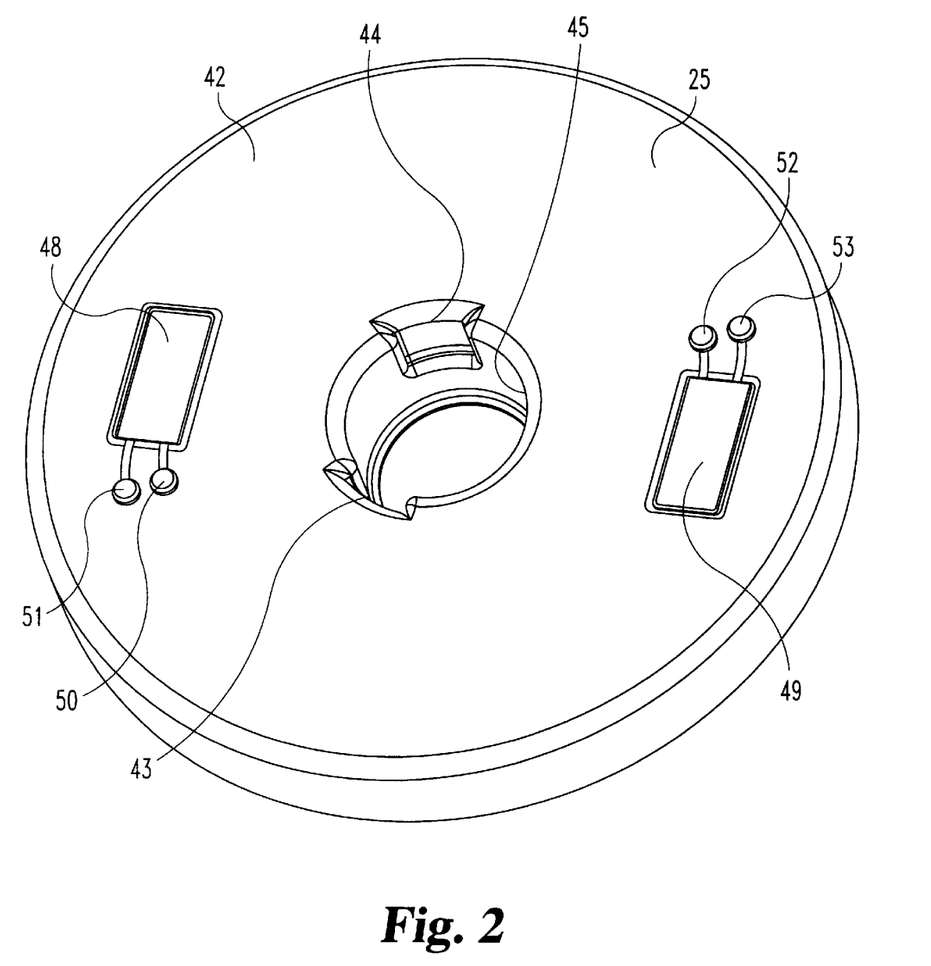
FIG. 2 is a perspective view of an endplate comprising a portion of a replaceable cartridge which is illustrated in FIG. 1.
Figure 3:
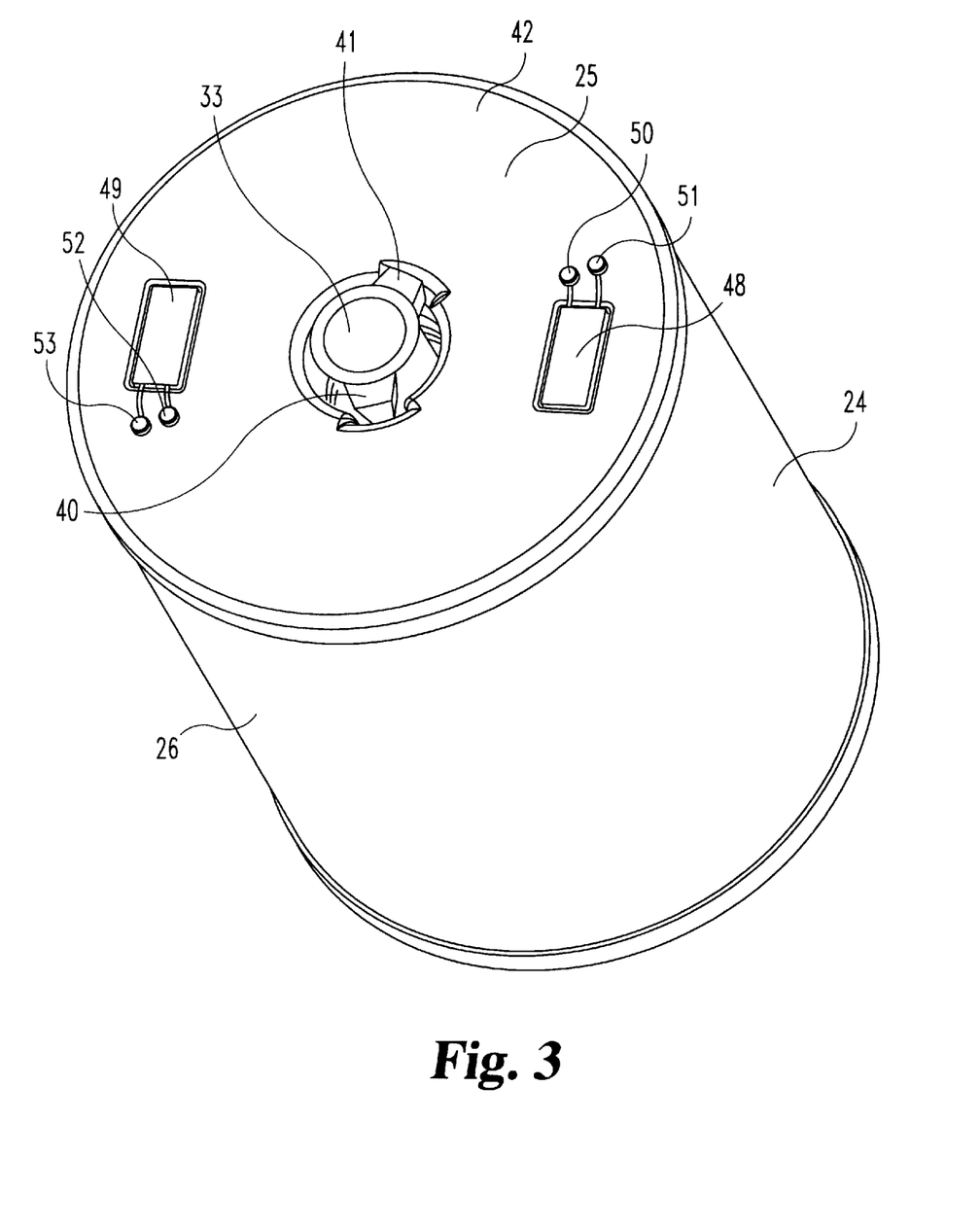
FIG. 3 is a perspective view of the FIG. 1 replaceable cartridge as installed on a centerpost component which is part of the housing which is illustrated in FIG. 1.
Figure 4:
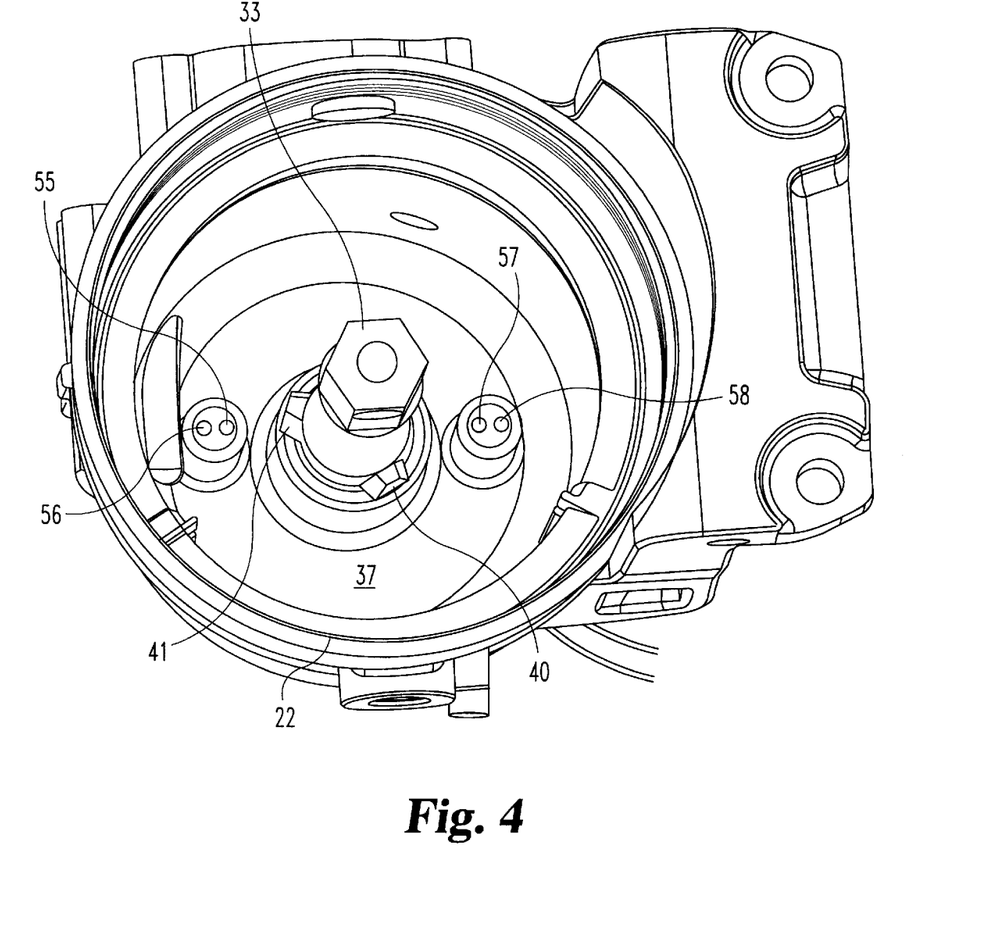
FIG. 4 is a perspective view of the inner surface of a base portion of the FIG. 1 housing including the centerpost.

Referring to FIGS. 1, 2, and 3, there is illustrated an integrated filter module 20 which includes a replaceable cartridge 21 installed into a reusable housing 22 (see FIGS. 1 and 4). In accordance with the present invention and as described herein, there is a keyed interfit between cartridge 21 and housing 22 to ensure that there is one and only one proper installation relationship between the cartridge 21 and the housing 22. Cartridge 21 includes a filter element 24 and an endplate 25 which is adhesively bonded to one end 26 of the filter element 24. The filter element 24 is generally cylindrical and the cylindrical sidewall 27 defines a hollow, generally cylindrical interior 28.

Housing 22 is generally cylindrical with a sidewall 31 which defines a generally cylindrical hollow interior 32. A centerpost 33 is included as part of housing 22 or may be assembled into an interior base portion of the housing 22 as a separate component. In the illustration of FIG. 1, the centerpost 33 is assembled into the interior base portion of the housing 22 as a separate component. In one form, the centerpost 33 is substantially cylindrical throughout and the filter cartridge 21 is constructed and arranged to slide down, over the centerpost 33.

As shown in FIG. 1, the upper end of the replaceable cartridge 21 includes an endplate 35 which is bonded to the upper end of the filter element 24. The housing 22 has a lid 36 and a base portion 37. The lid 36 is then screwed onto or into the open, upper end of the housing to complete the assembly. A spring 38, such as a leaf spring, is attached to the lid 37 in order to properly seat and spring load the cartridge 21. The lid 36 is constructed and arranged to press down on the filter cartridge 21 as the lid 36 is threadedly advanced relative to the housing 22. The cartridge 21 is pushes against spring 38 so as to spring bias the cartridge 21 and help retain the cartridge 21 in the desired orientation without any noticeable movement or vibration. The range of compression motion enabled by the resiliency of the spring 38 lessens the criticality of the lid tolerances and of the lid 36 to housing 22 assembly relationship.

This described configuration, whether with or without a spring, typically allows the filter cartridge 21 to have any desired rotational orientation relative to the housing 22 and centerpost 33 and still assemble as described. So long as a replacement filter cartridge has the correct length, the correct inside diameter and the correct outside diameter, the replacement cartridge will be compatible with the centerpost 33 and base portion 37 of the reusable housing 22. One problem with this wide-open structural compatibility is the ability for virtually any manufacturer to offer a replacement cartridge which will fit. However, merely "fitting" does not mean that the performance specifications comply with the requirements of the OEM. If the required performance specifications and functional requirements for the filter assembly, as set by the OEM of the filter assembly and/or by the vehicle manufacturer are not met, then use of an inferior, low-cost filter cartridge could damage the vehicle. The risk is that the mere fit of a replacement cartridge will be misinterpreted as representing a suitable and quality filter cartridge which meets all of the OEM performance specifications for the filter assembly and for the particular application.

One way to address this concern, as provided by the present invention, is to create a unique interfit capability or feature between the filter cartridge 21 and the housing 22 such that only an approved filter cartridge, meeting the OEM performance specifications, will be entitled to include the interfit feature. Without this interfit feature, the filter cartridge 21 will not properly assemble onto the centerpost 33 and into the housing 22.

With continued reference to FIGS. 1, 2, 3, and 4, the centerpost 33 of the present invention includes a pair of spaced-apart and outwardly-protruding keys 40 and 41 which are positioned at the base of the centerpost 33, adjacent to the upper surface of the base portion 37 of the housing 22. As would be understood, without the proper cartridge orientation as described herein, the upper surface of these two keys 40 and 41 will be contacted by the lower surface 42 of endplate 25 as the cartridge 21 slides down over the centerpost 33 in the direction of the two keys 40 and 41. This specific structural relationship is established due to the relatively close size fit between the hollow, generally cylindrical interior 28 of the filter element 24 and the outside diameter size of the centerpost 33. With a minimal clearance between these two generally cylindrical surfaces, the lower surface 42 of endplate 25 will in fact come in contact with keys 40 and 41 unless, as described herein, there is the proper rotational orientation of the cartridge. While the concept of having one and only one unique position (rotational orientation) for the cartridge 21 within the housing 22 can be achieved by a single key and a single a matching keyway, the use of two (or more) is preferred.

In order to permit cartridge 21 to fully and properly seat within the housing 22, two matching keyways 43 and 44 are formed into the inside diameter surface 45 of endplate 25 (FIG. 2). The two keyways 43 and 44 are radially positioned, circumferentially spaced, and sized in axial height and radial width and circumferential length in order to receive the two keys 40 and 41, respectively. The clearance provided by keyways 43 and 44 for keys 40 and 41 enables the cartridge to fully seat axially within housing 21 so that the lower surface 42 of endplate 25 is in contact with the upper surface of base portion 37. By locating the two keys 40 and 41 and the cooperating keyways 43 and 44 on circumferential spacing of something other than 180 degrees, there is one and only one rotary orientation for the cartridge 21 which allows it to install properly within the housing 22. This assembly relationship is illustrated in the bottom perspective view of FIG. 3.

One of the related benefits of the key-keyway installation interfit between cartridge 21 and housing 22 relates to the use of electronic components, or possibly mechanical devices, as part of the cartridge which are connected to other portions of the vehicle electrical system for the performance of some function such as gathering and/or transmitting data relating to the cartridge and/or the condition of fluid being filtered by the cartridge 21. The keyed cartridge feature of the present invention provides for a unique interfit between the cartridge 21 and housing 22 so that only properly designed cartridges, which meet the OEM specifications, will be properly installed in the housing 22. Once properly installed, the cartridges 21 then are able to cooperate with electrical contacts mounted in the base portion 37 of the filter housing 22 in order to establish electrical continuity with one or more electronic components incorporated into the design of the filter cartridge, preferably as part of the lower endplate 25 for the filter cartridge 21. Some of the electronic components which are contemplated by the present invention include sensors, computer chips, resistors, and electrical connection strips, for example.

The specific construction of the present invention which enables the use of electronic components or possibly mechanical devices as part of cartridge 21 includes placing two electrical contacts into the housing 22 for each such component which is incorporated as part of the cartridge. Then, by providing input power to these two contacts from a source external to the filter assembly 20, the component(s) are able to be activated or energized for purposes of data transmission. The selected electronic components each include a pair of electrical leads for establishing an electrical connection with the two corresponding electrical contacts placed in the housing if, and only if, the cartridge is properly installed in the housing.

In the disclosed embodiment of FIG. 2, a sensor 48 and a data chip 49 are each included as part of the lower endplate 25. In another form (not shown), a data strip is incorporated into the lower endplate 25. The sensor 48 and the data chip 49 are included as part of the filter cartridge 21. Cooperating electrical leads 50 and 51 for sensor 48, and leads 52 and 53 for data chip 49 have a predetermined and precise radial and circumferential location on the lower surface 42 of endplate 25. The base 37 of housing 22 includes four matching electrical contacts 55, 56, 57 and 58 (see FIG. 4). These four matching electrical contacts also have a predetermined and precise radial and circumferential location. The matching locations for the electrical contacts 50, 51, 52 and 53 on the endplate 25 and the electrical contacts 55, 56, 57 and 58 on the base 37 of the housing 22 align with each other only when the cartridge 21 is properly installed in the housing 22. In the preferred embodiment, contacts 55 and 56 are designed to contact contacts 50 and 51, respectively. Contacts 57 and 58 are designed to contact contacts 52 and 53, respectively. In this regard, it is to be noted that cartridge 21 can be properly installed onto centerpost 33 and into housing 22 and fully down onto base 37 only when the two spaced keys 40 and 41 and the cooperating keyways 43 and 44 are all properly aligned. If the cartridge 21 is rotated so that the two spaced keys 40, 41 and the two spaced cooperating keyways 43, 44 are not in alignment, then the cartridge 21 will not be fully installed and the contacts 50, 51, 52 and 53 of the endplate 25 will not be able to engage and establish an electrical connection with the contacts 55, 56, 57 and 58 mounted into the base 37 of the housing 22.

Once the keys 40, 41 and keyways 43, 44 are properly aligned so that the cartridge 21 can be properly installed, all of the cooperating pairs of contacts will be placed in electrical contact with each other so as to enable the powering of each of the corresponding electrical components. As illustrated in FIG. 1, power is applied to the four matching electrical contacts 55, 56, 57, and 58 from an external source by way of connecting wires 59a–59d, thereby powering up each electronic component, so long as the cartridge 21 is properly installed in housing 22. Compression of the spring 38 due to the force on the cartridge 21 from the threaded advancement of the lid 36 ensures that the two aligned pairs of electrical contacts remain in contact and provide electrical continuity in order to keep components 48 and 49 powered and enable data transmission to and from those components.

In the preferred embodiment of the present invention, sensor 48 is constructed and arranged to enable real-time analysis of the fluid and alert the operator when something in the vehicle system requires immediate attention. One benefit from the fluid analysis is to be able to determine if the fluid, such as oil, is being changed along with the filter for warranty records. One of the benefits from the vehicle system analysis is to provide data to the electronic control module (ECM) of the vehicle, enabling the unit to be shut down in the event of a safety hazard.

In the preferred embodiment of the present invention, the data chip 49 is constructed and arranged to enable the ECM of the vehicle or other data system which may be utilized to tell what type of filter is being used and to provide an individual serial number for the filter cartridge 21. Knowing the serial number allows the ECM or data system to determine when the filter cartridge 21 is installed and when it is removed for warranty records. Additionally, by knowing the type of filter cartridge being used, the ECM is able to alert the driver or operator when the filter cartridge 21 needs to be changed based on the service interval. Still further, the cooperating data system can alert the driver or operator that a non-OEM product is being used and then prevent the equipment or engine from starting or take other actions as determined by the OEM. The use of the data chip or other means to identify not only the type of filter cartridge which is installed, but to provide a serial number of the filter will allow OEM's to program their data systems on the vehicle to record the filter type and service interval information for warranty claims. Currently, during warranty claims, there is no way to guarantee that a customer has always used the correct OEM filter.

Figure 5:
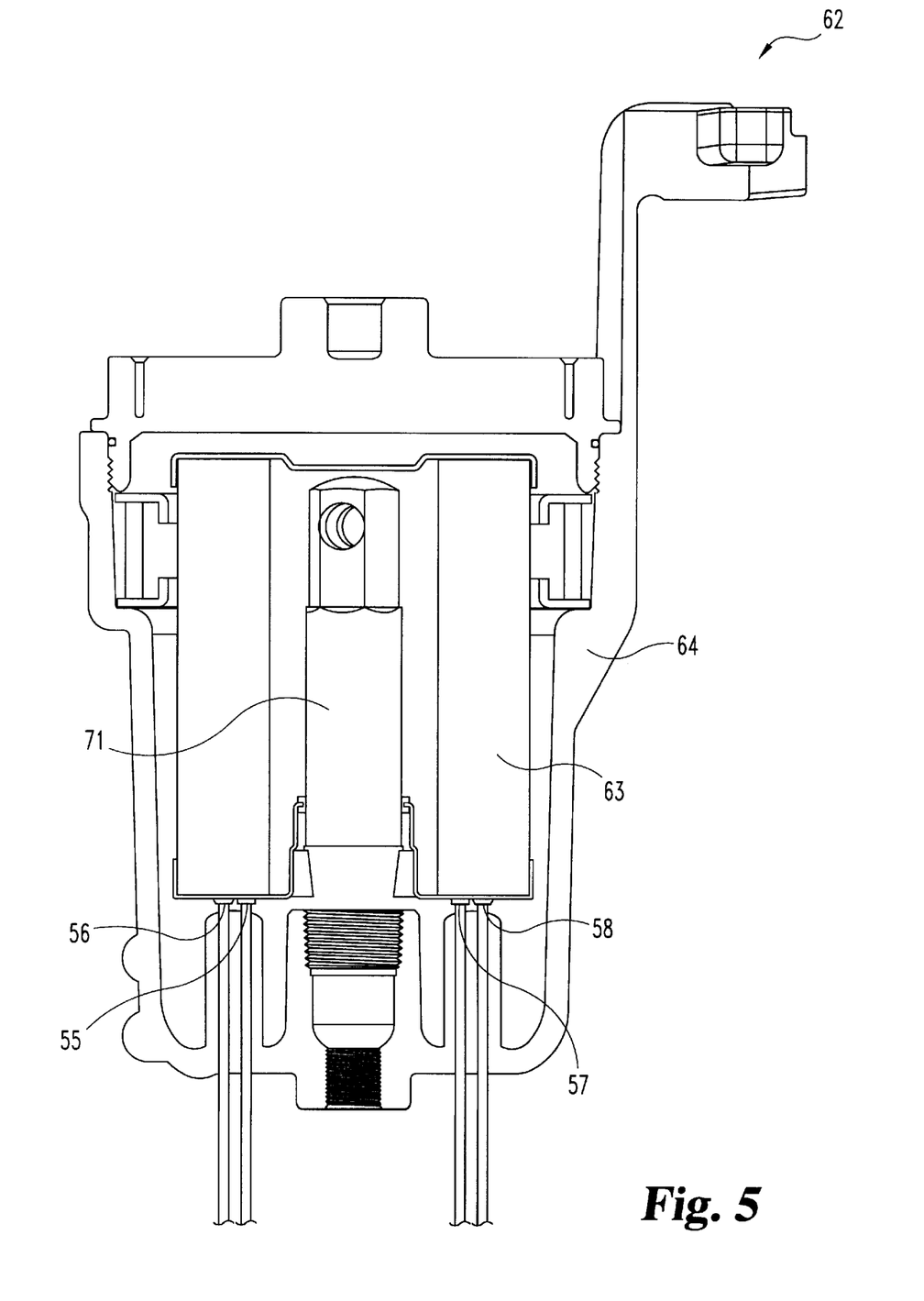
FIG. 5 is a front elevational view in full section of a replaceable-cartridge filter according to another embodiment of the present invention.
Figure 6:
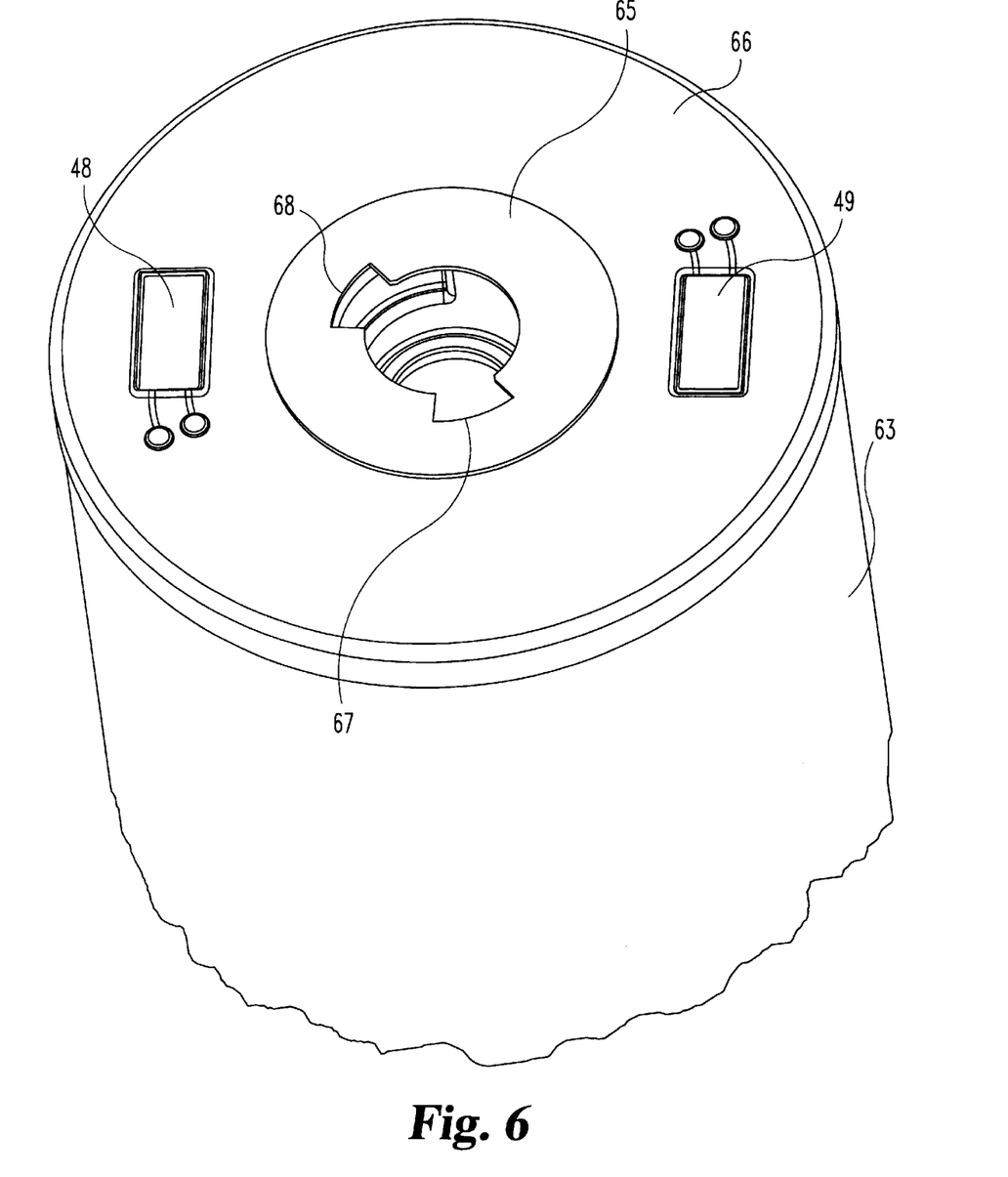
FIG. 6 is a partial, perspective view of a filter cartridge comprising one portion of the FIG. 5 replaceable-cartridge filter.
Figure 7:
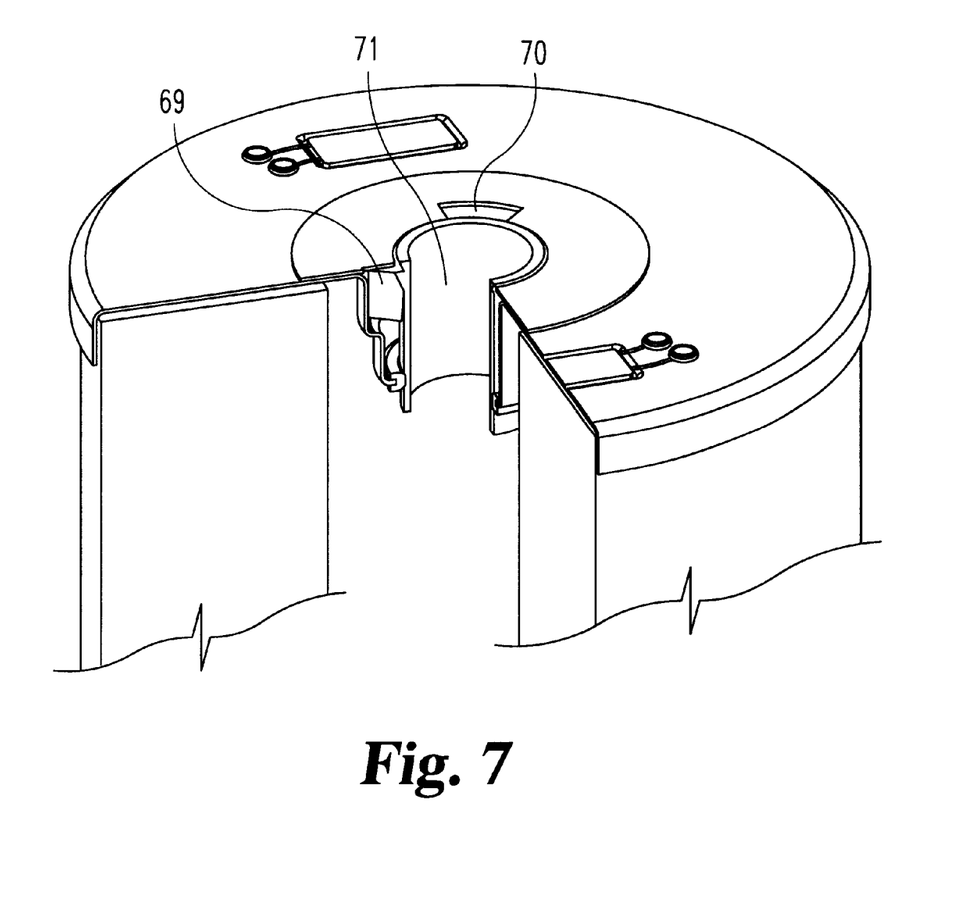
FIG. 7 is a partial, perspective view in partial section of the FIG. 6 filter cartridge as assembled onto a centerpost portion of a housing which comprises one portion of the FIG. 5 replaceable-cartridge filter.
Figure 8A:
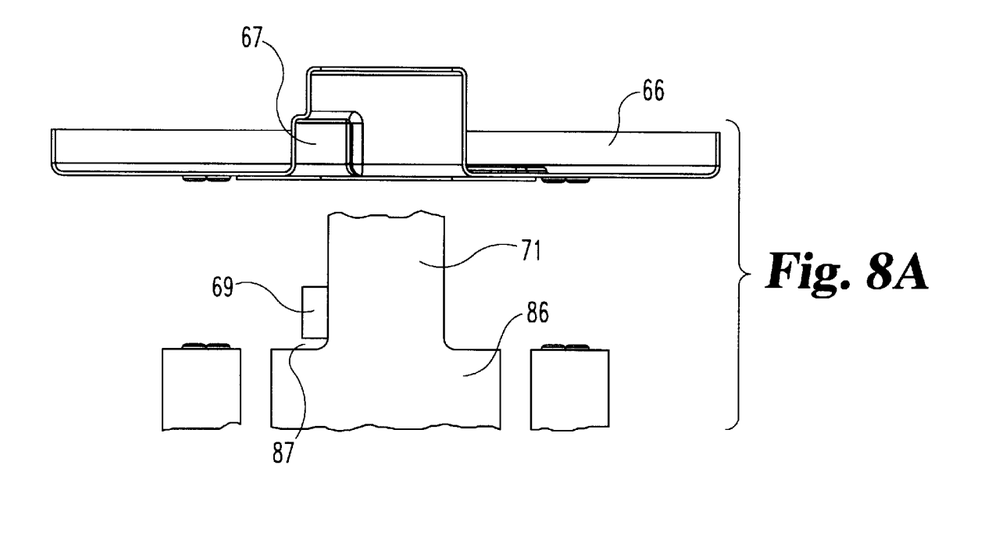
Figure 8B:
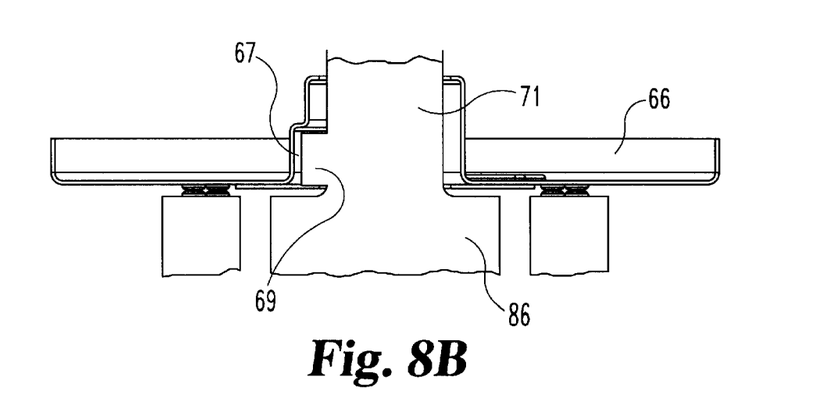
FIG. 8B is a partial, diagrammatic view illustrating full engagement prior to a one-eighth turn rotation.
Figure 8C:
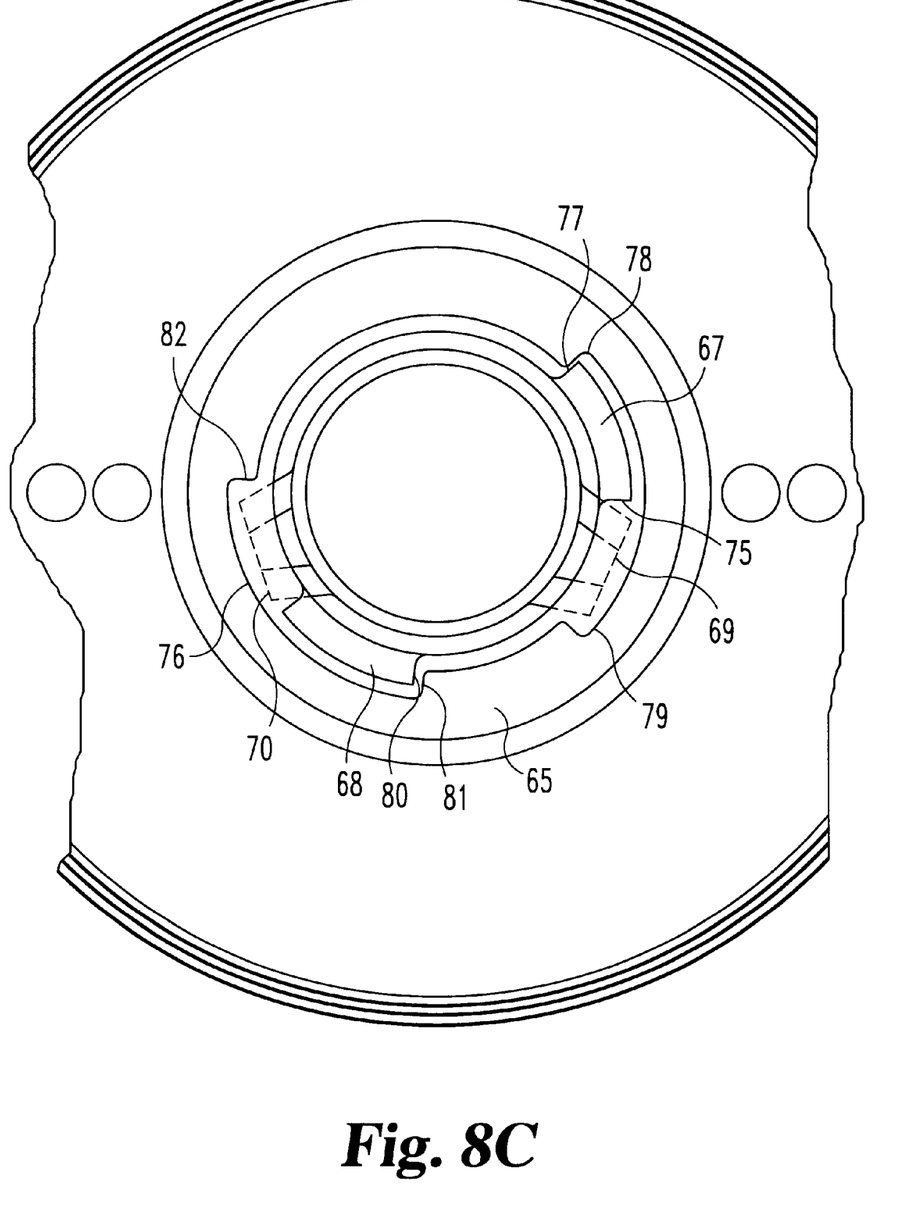
FIG. 8C is a top plan, diagrammatic view illustrating the relationship after the one-eighth turn rotation of the filter cartridge relative to the housing.

With reference now to FIGS. 5, 6, 7, and 8A–8C, a second embodiment of the present invention is illustrated. While the configuration of filter 62 is similar in many respects to filter 20, the interfit between the replaceable cartridge 63 and housing 64 is a little different from the design of filter 20. Cartridge 63 includes a cover plate 65 that is securely assembled into endplate 66 (FIG. 6). Cover plate 65 includes two keyways 67 and 68 which are required for receiving two matching keys 69 and 70 formed on the outer surface of centerpost 71. Each keyway 67 and 68 has a radial depth and circumferential length which are large enough to receive keys 69 and 70. A further feature of cartridge 63 includes two relief areas 75 and 76 formed in the endplate 66 (FIG. 8C). Each relief area 75 and 76 has a radial depth which is substantially the same as the radial depth of each keyway 67 and 68. The circumferential length of each relief area 75 and 76 is greater than the circumferential length of each keyway 67 and 68. The axial height of each relief area 75 and 76 is large enough to receive a corresponding one of the keys 69 and 70. The first end 77 of keyway 67 is generally aligned with the first end 78 of relief area 75. The opposite end 79 of relief area 75 is covered by a portion of cover plate 65. In a similar manner, the first end 80 of keyway 68 is generally aligned with the first end 81 of relief area 76. The opposite end 82 of relief area 76 is covered by a portion of cover plate 65.

When the replaceable cartridge 63 is installed into housing 64 and onto centerpost 71, the cartridge 63 moves without any interference until the keys 69 and 70 which are formed adjacent the base of centerpost 71 are (or may be) contacted by cover plate 65. If the keyways 67 and 68 are not aligned with keys 69 and 70 when the keys are reached by cover plate 65, any further advancement of the cartridge 63 will be stopped due to this interference. In order to complete the assembly, the cartridge 63 must be turned or rotated until the keys 69, 70 and keyways 67, 68 are aligned and then once aligned, the cartridge 63 can be fully advanced onto the centerpost 71 and into the housing 64.

As illustrated in FIGS. 8A–8C, the keys 69 and 70 are axially spaced above base 86 of housing 64. The axial dimension of this clearance space 87 is larger than the thickness of cover plate 65, but only slightly. In this manner, when the cartridge 63 is fully advanced into the housing 64, the keys 69 and 70 are disposed in axial alignment with relief areas 75 and 76. When the cartridge 63 is rotated, each of the keys 69 and 70 in effect travel within the corresponding relief areas 75 and 76 from the first end to the opposite end, an overall rotation of approximately one-eighth of the circumference. When the leading edge of each key 69, 70 abuts against the opposite end of its corresponding relief area, the key is captured beneath cover plate 65. When fully rotated in this manner, the endplate 66 is positioned relative to the base of the housing 64 so that electrical contact can be established between whatever electronic components are incorporated as part of the endplate 66 and the base of the housing 64.

Similar to the structure described for filter 20, the endplate 66 of cartridge 63 may include one or more electronic components such as sensor 48 and/or data chip 49. These three components are illustrated in FIGS. 6 and 7 for the filter 62 embodiment. However, a lesser number or greater number of such components can be used. Each such component includes two electrical leads or contacts. When sensor 48 and data chip 49 are present, the cooperating and matching electrical contacts 55, 56, 57, and 58 are assembled to the base 86 of housing 64 at the precise location and spacing in order to make electrical contact and thereby close the circuit for each of the corresponding components. Contact between the pair of leads associated with each component and the contacts positioned within the base of the housing is made only after the keys 69 and 70 are located in the relief areas 75 and 76 and the cartridge 63 is rotated fully to ensure that each key 69, 70 abuts up against the opposite end 79 or 82 of the corresponding relief area.

As with the first embodiment of filter 20, power is applied to contacts 55, 56, 57, and 58 of filter 62 from an external source by way of connecting wires 59a–59d, thereby enabling the powering up of each electronic component and data transmission to and from each component. In this embodiment, the electronic components include sensor 48, and data chip 49.

If desired, cartridge 63 can be spring loaded by locating a wave spring washer or similar spring member adjacent the base 86. Then, in order to locate the two keys 69 and 70 into the corresponding relief areas 75 and 76, the wave spring washer needs to be flattened (i.e., compressed) slightly, thereby establishing a spring-loaded or spring-biased relationship between cartridge 63 and housing 64.

Figure 9:
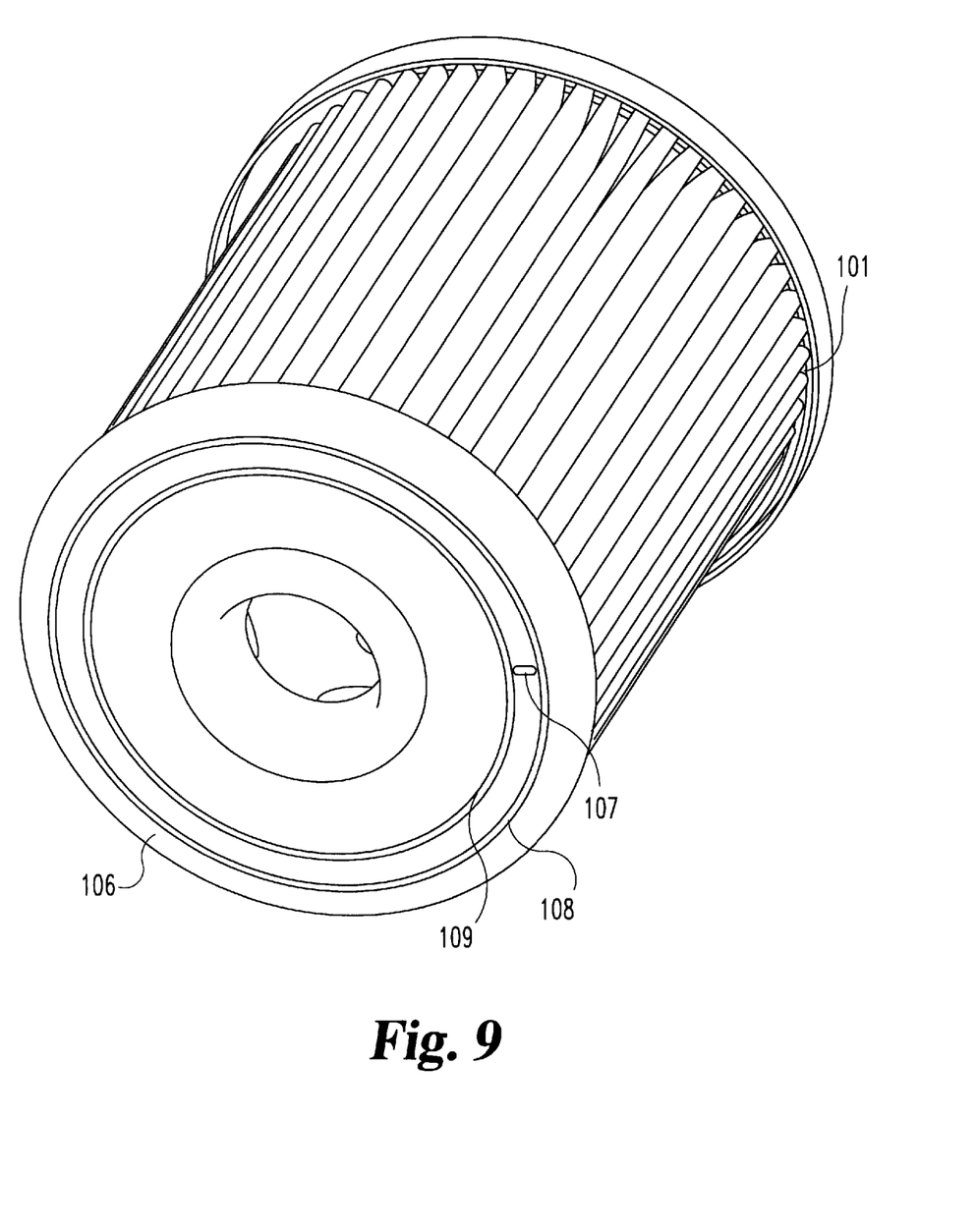
FIG. 9 is a perspective view of a filter cartridge incorporating data transmission feature according to another embodiment of the present invention.
Figure 10:
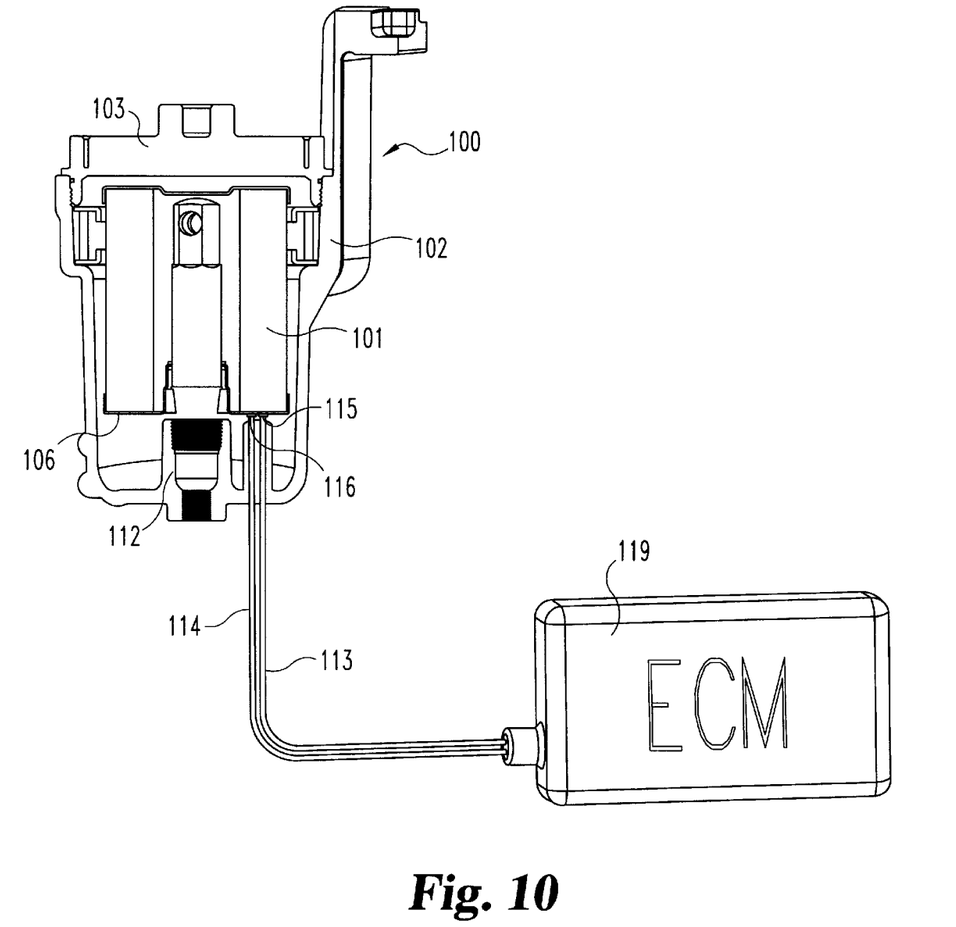
FIG. 10 is a part diagrammatic, part front elevational view in full section of the FIG. 9 cartridge as installed in a filter housing and as connected to an electronic module, all according to an embodiment of the present invention.

With reference to FIGS. 9 and 10, another embodiment of the present invention is illustrated. Filter 100 includes a replaceable cartridge 101, housing 102, and lid 103. The cartridge 101 includes a lower endplate 106 which is constructed and arranged with an electronic component, such as an electronic logic circuit 107 in the preferred embodiment. Also included as part of endplate 106 are two printed circuit rings 108 and 109 which comprise electrical contacts for powering of the electronic logic circuit 107 or other component once the cartridge 101 is properly installed in the housing 102 and the input power source is energized. It is to be noted that the two leads coming from logic circuit 107 establish electrical contact with printed circuit rings 108 and 109. These leads from circuit 107 may be printed circuit paths or wires which are soldered to printed rings 108 and 109.

As shown in FIG. 10, a base 112 of housing 102 is constructed and arranged to receive leads 113 and 114 which terminate in exposed contacts 115 and 116, respectively. The contacts 115 and 116 are radially spaced in order to align with the location of rings 108 and 109, respectively. When cartridge 101 is properly installed in housing 102, ring 108 makes electrical contact with contact 115 of lead 113 and ring 109 makes electrical contact with contact 116 of lead 114. When external power is applied by way of leads 113 and 114, the circuit is completed and whatever is connected between rings 108 and 109 is activated (i.e., energized).

When the electronic logic circuit 107 is used and is electrically connected to rings 108 and 109, resulting automatically with the proper installation of the cartridge 101 into the housing 102, circuit 107 may take the form of a sensor, similar to sensor 48, or a data chip, similar to data chip 49. Virtually any number of electronic components may be integrated into endplate 106, noting that the only requirement is to wire the positive and negative leads of the component directly to the positive printed circuit ring 108 and to the negative printed circuit ring 109, respectively.

One option for the electronic component to be incorporated into endplate 106 of cartridge 101 is to use an electrical resistor bridge between rings 108 and 109. By connecting an ECM 119 of the engine (see FIG. 10) to the two contacts 115 and 116 which are exposed at base 112, the current flow across the resistor is able to be measured. By carefully and precisely selecting the resistance, the current measurement by the ECM 119 indicates whether a "correct" filter cartridge is installed. If a filter cartridge is installed without the two rings and resistor, or with a different resistance value, the ECM 119 is able to recognize the error and signal the operator to check the filter cartridge. In effect, this particular design creates a type of "fingerprint" circuit or component for the filter cartridge, enabling a correct identification and enabling an alert warning when a correctly styled and configured cartridge is not installed. This fingerprinting can also be achieved by the use of a unique data chip with filter code information.

This same type of filter-code or filter-identification (i.e., fingerprint) concept can be used with virtually any type of electronic component which is assembled into the filter cartridge endplate 106. So long as the selected electronic component is able to generate a particular code, signal, or data stream once energized or commanded to do so, it can be used to identify whether or not the installed cartridge is an approved cartridge and a correct design for the housing and the specific application. A read only memory (ROM) as part of the electronic component is also an option, allowing the ECM to simply read the programmed data as a way of identifying the specific filter cartridge. The connection made to the housing 102, whether by the ECM 119 or some other circuit, is preferably designed to provide power to whatever components that are assembled into the endplate 106 and to read the data or information which is transmitted in return by the electronic component as a way of identifying the correct filter cartridge. If a sensor is included as part of the cartridge endplate 106, then operational parameters associated with the filter 100 and the conditions of the liquid being filtered can also be monitored.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A replaceable cartridge for a filter assembly, the filter assembly including a housing that includes at least two electrical housing contacts, the replaceable cartridge comprising:

a filter element having a sidewall that defines a hollow interior, said filter element being constructed and arranged to filter a fluid;

an endplate provided at one end of said filter element;

at least two electrical filter contacts coupled to said endplate, said filter contacts being constructed and arranged to contact the housing contacts upon installation of the replaceable cartridge into the housing;

a data component operatively coupled to said filter contacts, said data component being constructed and arranged to provide filtration data information to a remote station when said data component is energized;

a centerpost attached to said housing and formed with a key boss; and said endplate assembled to a cover plate and defining a center aperture which is sized to receive said centerpost said center aperture being formed with a keyway, wherein said keyway in said endplate is extended in a circumferential direction to include a relief section that is closed over by a portion of said cover plate, such that when said key boss is received in said relief section, said filter contacts connect with said housing contacts and the data component is energized.

2. The replaceable cartridge of claim 1, wherein said data component includes a sensor and said filtration data information relates to at least one parameter of the fluid being filtered.

3. The replaceable cartridge of claim 1, wherein said data component includes a data chip and said filtration data information relates to at least one of parameter of the replaceable cartridge.

4. The replaceable cartridge of claim 1, wherein said data component includes a resistor and said filtration data information provides a resistive value that is unique to the replaceable cartridge.

5. The replaceable cartridge of claim 1, wherein said filter element has a generally cylindrical shape.

6. The replaceable cartridge of claim 1, wherein said electrical filter contacts are constructed and arranged as leads extending from said data component.

7. The replaceable cartridge of claim 1, wherein said data component is attached to said endplate.

8. A filter assembly, comprising:

a housing including
  at least two housing electrical contacts attached to said housing, and
  a centerpost attached to said housing, said centerpost having at least one key-shaped member extending therefrom; and a filter cartridge including
  a filter element for filtering a fluid,
  an endplate attached at one end of said filter element, said endplate defining an aperture with at least one keyway having a circumferentially offset relief section,
  at least two filter electrical contacts provided on said endplate, said filter electrical contacts contacting said housing electrical contacts,
  a data component operatively coupled to said filter contacts, and
  wherein said assembly is configured such that when said key-shaped member is received in said keyway and said keyway is rotated such that said relief section receives said key-shaped member to install said filter cartridge, an electrical connection is established between said filter electrical contacts and said housing electrical contacts and said data component is energized.

9. The filter assembly of claim 8, wherein;

said endplate includes a cover closing over said relief section; and said filter cartridge is secured to said housing when said key-shaped member is received in said relief section.

* * * * *

UNITED STATES PATENT AND TRADEMARK OFFICE
CERTIFICATE OF CORRECTION

| | | |
|---|---|---|
| PATENT NO. | : 6,537,444 B2 | Page 1 of 1 |
| DATED | : March 25, 2003 | |
| INVENTOR(S) | : Daniel J. Wilberscheid and Robert R. Brackett | |

It is certified that error appears in the above-identified patent and that said Letters Patent is hereby corrected as shown below:

<u>Title page,</u>
Item [57], ABSTRACT,
Line 2, replace "thereof The" with -- thereof. The --.

Signed and Sealed this

Sixteenth Day of September, 2003

JAMES E. ROGAN
*Director of the United States Patent and Trademark Office*